United States Patent
Aburaya

(10) Patent No.: US 10,183,257 B2
(45) Date of Patent: Jan. 22, 2019

(54) METHOD OF PRODUCING COMPOSITE

(71) Applicant: FUJIFILM Corporation, Tokyo (JP)

(72) Inventor: Yoshihiro Aburaya, Ashigara-kami-gun (JP)

(73) Assignee: FUJIFILM Corporation, Minato-ku, Tokyo (JP)

( * ) Notice: Subject to any disclaimer, the term of this patent is extended or adjusted under 35 U.S.C. 154(b) by 172 days.

(21) Appl. No.: 15/225,175

(22) Filed: Aug. 1, 2016

(65) Prior Publication Data

US 2016/0339394 A1    Nov. 24, 2016

Related U.S. Application Data

(63) Continuation of application No. PCT/JP2014/082528, filed on Dec. 9, 2014.

(30) Foreign Application Priority Data

Feb. 4, 2014    (JP) .................................. 2014-019137

(51) Int. Cl.
*B01D 67/00*    (2006.01)
*B01D 69/12*    (2006.01)
(Continued)

(52) U.S. Cl.
CPC ....... *B01D 67/0083* (2013.01); *B01D 53/228* (2013.01); *B01D 67/0009* (2013.01);
(Continued)

(58) Field of Classification Search
CPC ....... B32B 5/022; B32B 27/12; B32B 27/286; B32B 27/32; B32B 27/322;
(Continued)

(56) References Cited

U.S. PATENT DOCUMENTS 5,522,991 A * 6/1996 Tuccelli ................. B01D 69/12
210/490
9,162,178 B2 10/2015 Hiraki et al.
(Continued)

FOREIGN PATENT DOCUMENTS

EP    0 443 642 A2    8/1991
JP    62-136212 A    6/1987
(Continued)

OTHER PUBLICATIONS

International Search Report for PCT/JP2014/082528 dated Mar. 17, 2015 [PCT/ISA/210].
(Continued)

*Primary Examiner* — Vishal I Patel
(74) *Attorney, Agent, or Firm* — Sughrue Mion, PLLC

(57) ABSTRACT

Provided is a method of producing a composite, which is capable of preventing a silicone coating solution, which becomes a silicone resin layer that prevents an acidic gas separation layer from entering a porous support, from entering the porous support, preventing a porous film and an auxiliary support film from being peeled off, and suitably forming a dense silicone resin layer on the surface of the porous support. The method thereof includes a coating process of coating the surface of the porous film side of the porous support with the silicone coating solution which becomes a silicone resin layer according to a roll-to-roll system. In the coating process, the conveying speed of the porous support is in a range of 0.5 m/min to 200 m/min, the viscosity of the silicone coating solution is in a range of 100 cP to 1000000 cP, and the peel force between the porous film and the auxiliary support film is 10 mN/min or greater.

16 Claims, 2 Drawing Sheets

(51) Int. Cl.
  *B01D 71/70* (2006.01)
  *B32B 5/02* (2006.01)
  *B32B 27/12* (2006.01)
  *B32B 27/28* (2006.01)
  *B32B 27/32* (2006.01)
  *B01D 53/22* (2006.01)
  *B01D 69/02* (2006.01)
  *B01D 69/10* (2006.01)
  *B01D 71/02* (2006.01)
  *B01D 71/36* (2006.01)
  *B01D 71/56* (2006.01)
  *B01D 71/68* (2006.01)

(52) U.S. Cl.
  CPC ......... *B01D 67/0079* (2013.01); *B01D 69/02* (2013.01); *B01D 69/105* (2013.01); *B01D 69/12* (2013.01); *B01D 71/02* (2013.01); *B01D 71/36* (2013.01); *B01D 71/56* (2013.01); *B01D 71/68* (2013.01); *B01D 71/70* (2013.01); *B32B 5/022* (2013.01); *B32B 27/12* (2013.01); *B32B 27/286* (2013.01); *B32B 27/32* (2013.01); *B32B 27/322* (2013.01); *B01D 2323/06* (2013.01); *B01D 2323/42* (2013.01); *B01D 2325/24* (2013.01); *B01D 2325/30* (2013.01); *B01D 2325/36* (2013.01); *B32B 2255/10* (2013.01); *B32B 2255/26* (2013.01); *B32B 2262/0253* (2013.01); *B32B 2262/0261* (2013.01)

(58) Field of Classification Search
  CPC ............ B32B 2255/10; B32B 2255/26; B32B 2262/0253; B32B 2262/0261; B01D 69/12; B01D 71/70; B01D 53/228; B01D 2323/42; B01D 2325/30; B01D 2325/36; B01D 69/105; B01D 69/02; B01D 67/0083; B01D 67/0079; B01D 71/02; B01D 2325/24; B01D 71/68; B01D 71/56; B01D 71/36; B01D 67/0009; B01D 2323/06

See application file for complete search history.

(56) References Cited

U.S. PATENT DOCUMENTS

2013/0284022 A1* 10/2013 Hiraki ................. B01D 53/228
                                                                96/4
2014/0137740 A1*  5/2014 Aburaya ............... B01D 53/22
                                                                96/13

FOREIGN PATENT DOCUMENTS

| JP | 62-140620 A | 6/1987 |
| JP | 64-030620 A | 2/1989 |
| JP | 04-215824 A | 8/1992 |
| JP | 07-102310 B2 | 11/1995 |
| JP | 10-502867 A | 3/1998 |
| JP | 11-217459 A | 8/1999 |
| JP | 2007-196185 A | 8/2007 |
| WO | 2012/096055 A1 | 7/2012 |
| WO | 2013/018538 A1 | 2/2013 |

OTHER PUBLICATIONS

Written Opinion for PCT/JP2014/082528 dated Mar. 17, 2015 [PCT/ISA/237].

International Preliminary Report on Patentability and Written Opinion, dated Aug. 18, 2016, issued in corresponding International Application No. PCT/JP2014/082528, 10 pages in English.

Communication dated Mar. 14, 2017, issued from the Japan Patent Office in corresponding Japanese Patent Application No. 2014-019137.

* cited by examiner

METHOD OF PRODUCING COMPOSITE

CROSS-REFERENCE TO RELATED APPLICATIONS

This application is a Continuation of PCT International Application No. PCT/JP2014/082528 filed on Dec. 9, 2014, which claims priority under 35 U.S.C. § 119(a) to Japanese Patent Application No. 2014-019137 filed on Feb. 4, 2014. The above application is hereby expressly incorporated by reference, in its entirety, into the present application.

BACKGROUND OF THE INVENTION

1. Field of the Invention

The present invention relates to a method of producing a composite used for an acidic gas separation film that selectively separates acidic gas from raw material gas.

2. Description of the Related Art

In recent years, a technique of selectively separating acidic gas such as carbon dioxide from raw material gas (gas to be treated) has been developed. For example, an acidic gas separation module that separates acidic gas from raw material vas using an acidic gas separation film through which acidic gas selectively permeates has been developed.

For example, JP1992-215824A (JP-H04-215824A) discloses an acidic gas separation module obtained by winding a laminate containing an acidic gas separation film around a central tube (central permeating material collection tube), in a tube wall of which through-holes are formed and which is used for collecting separated acidic gas, multiple times.

A so-called dissolution diffusion film is used for the acidic-gas separation module disclosed in JP1992-215824A (JP-H04-215824A) as an acidic gas separation film. The dissolution diffusion film separates acidic gas from raw material gas using differences in solubilities of acidic gas and materials to be separated therefrom in a film and differences in diffusibility in a film.

JP1995-102310B (JP-H07-102310B) discloses an acidic gas separation film formed with a hydrogel film that is formed by allowing a vinyl alcohol-acrylate copolymer having a cross-linked structure to absorb an aqueous solution including a carbon dioxide carrier on a carbon dioxide-permeating support, as an acidic gas separation film (carbon dioxide separation gel film) that separates carbon dioxide from raw material gas.

This acidic gas separation film is an acidic vas separation film using a so-called facilitated transport film. The facilitated transport film has a carrier reacting with acidic gas, such as a carbon dioxide carrier, therein and separates acidic gas from raw material gas by transporting the acidic gas to the opposite side of the film using the carrier.

Such an acidic gas separation film typically has a configuration in which the above-described dissolution diffusion film or facilitated transport film (hereinafter, both films are collectively referred to as a separation film) is formed on the surface of a support (porous support) having gas permeability, for example, non-woven fabric or a porous film.

For this reason, when the acidic gas separation film is formed or used, the separation layer gradually enters (infiltrates into) the porous support in some cases. Particularly, the facilitated transport film is frequently a gel film or a film having low viscosity in order to move or transport acidic vas. Accordingly, when the acidic gas separation film using the facilitated transport film is used, the separation layer gradually enters the porous support.

In the acidic gas separation film, the performance of separating out acidic gas is degraded with time due to the separation layer entering the porous support.

Further, in order for the carrier to fully function, the facilitated transport film needs to hold a large amount of water therein. For this reason, a polymer with excellent water-absorbing properties and water-holding properties is used for the facilitated transport film. In addition, the amount of water able to be absorbed of the facilitated transport film is increased and the performance of separating out acidic gas is improved when the content of the carrier such as metal carbonate is large. That is, the facilitated transport film is frequently a gel film which is extremely soft (low viscosity).

Moreover, in the acidic gas separation film using the facilitated transport film, raw material gas under the conditions of a temperature of 100° C. to 130° C. at a humidity of approximately 90% is supplied at a pressure of 1.0 MPa or greater at the time of separating out acidic gas.

Therefore, in the acidic gas separation film using the facilitated transport film, the facilitated transport film tends to enter the porous support and the durability is low.

Further, JP1987-140620A (JP-S62-140620A) discloses a method of producing an acidic gas separation film (method of producing a thin film) which includes coating a surface of a porous support with a solution including a polymer as a main component; forming a base layer formed of a polymer having air conductivity such as a silicone-based polymer; coating the base layer with an organic solvent solution including a material which becomes a separation layer as a main component; and drying the base layer to form the separation layer.

When the acidic gas separation film according to this production method has the base layer formed of a polymer having air conductivity, it is possible to form a uniform separation layer and to prevent the separation layer with low viscosity from entering the porous support.

SUMMARY OF THE INVENTION

As disclosed in JP1987-140620A (JP-S62-140620A), when a non-porous base layer having air conductivity such as a silicone-based polymer is formed on the surface of the porous support and a separation layer is formed thereon, it is possible to prevent the separation layer from entering the porous support.

Such a base layer is typically formed by coating the surface of the porous support with a coating solution containing a component which becomes the base layer and drying and curing the surface.

However, there is a concern that the coating solution infiltrates into the porous support while the porous support is coated with the coating solution which becomes the base layer. Due to the infiltration of the coating solution into the porous support, there is a problem in that an appropriate base layer is unlikely to be formed on the surface of the porous support.

Here, it is considered that the infiltration of the coating solution into the porous support may be prevented by increasing the viscosity of the coating solution which becomes the base layer and raising the conveying speed of the porous support at the time of application to shorten the time taken for the solution to be cured.

Meanwhile, as a support carrying an acidic gas separation layer, a porous film having multiple fine through-holes is used. However, such a porous film easily cracks and the handleability thereof becomes degraded. For this reason, a support formed by laminating an auxiliary support film, such as non-woven fabric as a reinforcing material, on a porous film is used as a porous support.

However, when the surface of the porous support formed by laminating the auxiliary support film on the porous film in the above-described manner is coated with a coating solution which becomes a base layer and has high viscosity at a high conveying speed, it is understood that a problem in which the porous film and the auxiliary support film are peeled off occurs because the porous film is pulled by the coating solution.

An object of the present invention is to provide a method of producing a composite, which is capable of preventing a silicone coating solution, which becomes a silicone resin layer that prevents an acidic gas separation layer from entering a porous support, from entering the porous support, preventing a porous film and an auxiliary support film from being peeled off, and suitably forming a dense silicone resin layer on the surface of the porous support, by means of solving the above-described problems of the related art.

As a result of intensive research performed by the present inventors to solve the above-described problems, they found that, when a production method including a coating process of coating a surface of a porous film side of the porous support with a silicone coating solution which becomes the silicone resin layer is performed according to a roll-to-roll system, in which in the coating process, the conveying speed of the porous support is in a range of 0.5 m/min to 200 m/min, the viscosity of the silicone coating solution is in a range of 100 cP to 1000000 cP, and the peel force between the porous film and the auxiliary support film is 10 mN/mm or greater, it is possible to prevent the silicone coating solution from entering the porous support, to prevent the porous film and the auxiliary support film from being peeled off, and to suitably form a dense silicone resin layer on the surface of the porous support, thereby completing the present invention.

In other words, the present invention is to provide a method of producing a composite having the following configurations.

(1) A method of producing a composite formed by forming a silicone resin layer on a surface of a porous support and having a surface on which an acidic gas separation layer is formed in an acidic gas separation film having the acidic gas separation layer, the method comprising: coating a surface of a porous film side of the porous support with a silicone coating solution which becomes the silicone resin layer according to a roll-to-roll system using, as the porous support, a support formed by laminating an auxiliary support film on the porous film, in which, in the coating process, the conveying speed of the porous support is in a range of 0.5 m/min to 200 m/min, the viscosity of the silicone coating solution is in a range of 100 cP to 1000000 cP, and the peel force between the porous film and the auxiliary support film is 10 mN/mm or greater.

(2) The method of producing a composite according to (1), further comprising coati the surface of the silicone resin layer with a coating composition which becomes the acidic gas separation layer using a roll-to-roll system.

(3) The method of producing a composite according to (1) or (2), in which the acidic gas separation layer is a facilitated transport film which contains a carrier at least reacting with acidic gas and a hydrophilic compound for carrying the carrier.

(4) The method of producing a composite according to any one of (1) to (3), in which the porous film includes one or more materials selected from the group consisting of a fluorine-containing polymer, an olefin polymer, and a sulfone polymer.

(5) The method of producing a composite according to any one of (1) to (4), in which the porous film includes one or more materials selected from the group consisting of PTFE, polypropylene, polysulfone, and polyether sulfone.

(6) The method of producing a composite according to any one of (1) to (5), in which the auxiliary support film is non-woven fabric which includes one or more materials selected from the group consisting of polypropylene, modified polyamide, and a fluorine-containing resin.

(7) The method of producing a composite according to any one of (1) to (6), further comprising curing the silicone coating solution to form the silicone resin layer within seven seconds after the surface of the porous film is coated with silicone coating solution.

According to the present invention, it is possible to prevent the silicone coating solution from entering the porous support, prevent the porous film and the auxiliary support film from being peeled off, and suitably form a dense silicone resin layer on the surface of the porous support.

DESCRIPTION OF THE PREFERRED EMBODIMENTS

Hereinafter, a method of producing a composite of the present invention will be described in detail with reference to preferred examples illustrated in the accompanying drawings.

Constituent elements described below are described based on exemplary embodiments of the present invention, but the present invention is not limited to such embodiments.

Further, in the present specification, the numerical ranges expressed using "to" indicate ranges of the numerical values described before and after "to" as the lower limits and the upper limits.

Figure 1A:
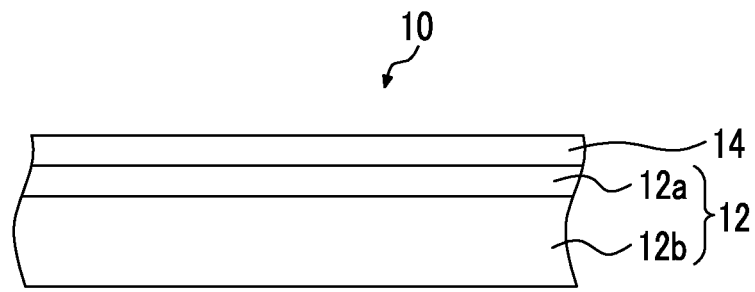
FIG. 1A and FIG. 1B are views schematically illustrating an example of a composite produced by a method of producing a composite of the present invention.

FIG. 1A schematically illustrates an example of the composite produced by the method of producing a composite of the present invention.

A composite 10 is a composite used for an acidic gas separation film having an acidic gas separation layer of a facilitated transport film and is configured by forming a silicone resin layer 14 on the surface of a porous support 12 having a porous film 12a and an auxiliary support film 12b.

As described above, there is a problem in that the durability of the acidic gas separation film using the facilitated transport film is poor due to the facilitated transport film which is a soft gel film entering (infiltrating into) the porous support. However, when the surface of the porous support 12 has the silicone resin layer 14 and the facilitated transport film (acidic gas separation layer) is formed on the surface of the silicone resin layer 14, it is possible to prevent the facilitated transport film from entering the porous support 12.

In the production method of the present invention, the long porous support 12 is used, the surface of the porous support 12 is coated with a silicone coating solution which becomes the silicone resin layer 14 according to a so-called roll-to-roll system (hereinafter, also referred to as a RtoR system). As is well known, the RtoR system is a production method in which a object to be treated is drawn out from a roll formed by winding a long object to be treated, the object to be treated is subjected to a treatment such as coating or curing while being conveyed in the longitudinal direction, and the treated object is wound in a roll shape.

Here, at the time of applying the silicone coating solution according to the method of producing a composite of the present invention, the conveying speed of the porous support 12 is in a range of 0.5 m/min to 200 m/min, the viscosity of the silicone coating solution is in a range of 100 cP to 1000000 cP, and the peel force between the porous film 12a of the porous support 12 and the auxiliary support film 12b is 10 mN/mm or greater.

Figure 2:
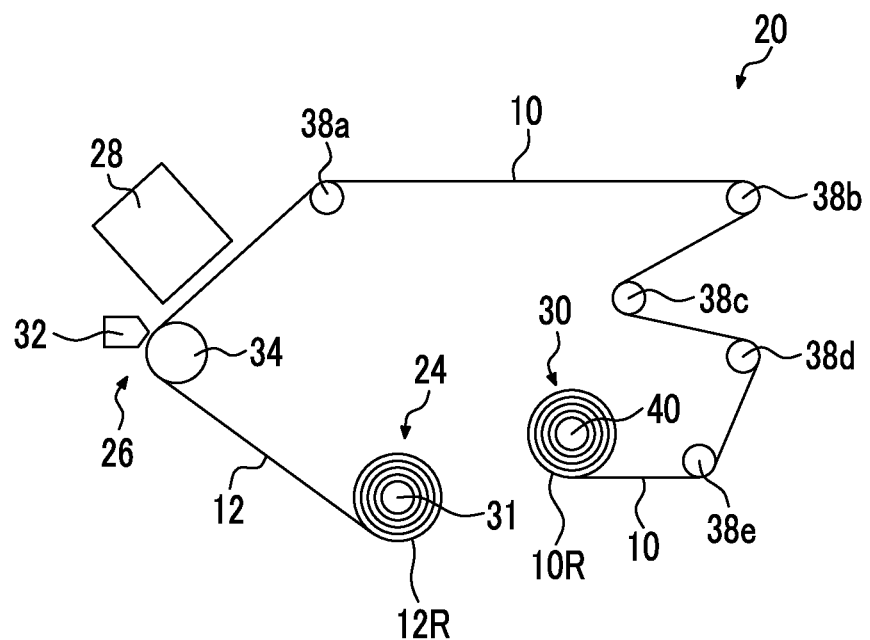
FIG. 2 is a view schematically illustrating an example of a production apparatus that performs the method of producing a composite according to the present invention.

FIG. 2 schematically illustrates an example of a production apparatus that performs the production method according to the present invention.

As described above, in the production method of the present invention, the composite 10 is produced using the RtoR system. Accordingly, in the production apparatus 20, the porous support 12 is fed from a support roll 12R formed by winding the long porous support 12 (web-like porous support 12) in a roll shape and the surface of the porous support 12 is coated with the silicone coating solution which becomes the silicone resin layer 14 while the porous support 12 is conveyed in the longitudinal direction. Subsequently, in the production apparatus 20, the silicone resin layer 14 is formed by curing the silicone coating solution applied to the porous support 12, and the composite 10 in which the silicone resin layer 14 is formed on the surface of the porous support 12 is obtained. Further, in the production apparatus 20, the composite 10 prepared in the above-described manner is wound (wrapped) in a roll shape and a composite roll 10R is obtained.

The production apparatus 20 is basically configured to include a supply unit 24, a coating unit 26, a curing device 28, and a winding unit 30.

Moreover, other than the members illustrated in the figure, the production apparatus 20 may include various members provided for an apparatus that produces a functional film according to the RtoR system, such as a pass roller (guide roller), conveying roller pairs, a conveying guide, and various sensors as needed.

The supply unit 24 is a portion in which a support roll 12R formed by winding the long porous support 12 in a roll shape is loaded to a rotary shaft 31 and the porous support 12 is fed by rotating the rotary shaft 31 (that is, the support roll 12R).

In the supply unit 24, the feeding and conveying of the support 12 may be performed according to a known method.

The porous support 12 (hereinafter, also referred to as the support 12) has permeability of acidic gas such as carbon dioxide and supports the silicone resin layer 14 formed on the surface thereof and a facilitated transport film formed on the surface of the silicone resin layer 14 or the surface of the support 12 (surface on the opposite side of the surface on which the silicone resin layer is formed).

As illustrated in FIG. 1A, the support 12 has a two-layer structure formed by laminating the porous film 12a and the auxiliary support film 12b on each other.

In the present invention, the porous film 12a side of the support 12 having a two-layer structure becomes a surface on which the acidic gas separation layer 16 is formed. Further, the silicone resin layer 14 is formed on the surface of the porous film 12a. That is, the silicone resin layer 14 is formed between the porous film 12a and the acidic gas separation layer 16.

The porous film 12a is formed with multiple fine through-holes. For this reason, when the acidic gas separation layer 16 is formed on the porous film 12a, the acidic gas permeability and the function of supporting the silicone resin layer 14 and the facilitated transport film (acidic gas separation layer 16) are more reliably expressed.

Moreover, the auxiliary support film 12b supports the porous film 12a. Since the porous film 12a is likely to crack and also likely to be stretched, the handleability thereof, at the time when the acidic gas separation layer 16 is formed or the porous film 12a is used as the acidic gas separation film 18, is improved by supporting the porous film 12a using the auxiliary support film 12b.

It is preferable that the porous film 12a has heat resistance and is formed of a material with low hydrolyzability. Examples of a material of such a porous film 12a include a fluorine-containing polymer, an olefin polymer, and a sulfone polymer. Specific examples of the porous film 12a include a membrane filter film such as polysulfone (PSF), polyether sulfone, polypropylene (PP), or cellulose; an interfacial polymerization thin film such as polyamide or polyimide; and a stretched porous film such as polytetrafluoroethylene (PTFE) or high molecular weight polyethylene.

Among these, preferably, the porous film 12a including one or more materials selected from a fluorine-containing polymer such as PTFE, PP, and PSF is exemplified. Among these, from the viewpoints of high porosity, small diffusion inhibition of acidic gas (particularly carbon dioxide), strength, and production suitability, a stretched porous film such as PTFE or high molecular weight polyethylene is preferable. Particularly, from the viewpoints of heat resistance and low hydrolyzability, a stretched porous film such as PTFE is desirably used.

The auxiliary support film 12b is provided for reinforcement of the porous film 12a.

Various materials can be used as the auxiliary support film 12b as long as strength, stretch resistance, and gas permeability required for the film are satisfied. For example, non-woven fabric, woven fabric, a net, or mesh can be appropriately selected and then used.

It is preferable that the auxiliary support film 12b has heat resistance and is formed of a material with low hydrolyzability similar to the above-described porous film 12a.

In consideration of this point, as the fibers constituting the non-woven fabric, woven fabric, or knitted fabric, fibers which are excellent in durability and heat resistance and formed of polyolefin such as polypropylene (PP); reforming polyamide such as ARAMID (trade name); a fluorine-containing resin such as polytetrafluoroethylene or polyvinylidene fluoride, and the like are preferable. It is preferable that the same material as described above is used for a resin material constituting mesh. Among these materials, non-woven fabric formed of PP which is inexpensive and has high mechanical strength is particularly preferably exemplified.

When the support 12 is extremely thin, the strength becomes weaker. In consideration of this point, it is preferable that the film thickness of the porous film 12a is in a range of 5 μm to 100 μm and the film thickness of the auxiliary support film 12b is in a range of 50 μm to 300 μm.

Here, in the present invention, the peel force between the porous film 12a and the auxiliary support film 12b is 10 mN/mm or greater.

According to the production method of the present invention, the surface of the porous film 12a (porous support) is coated with the silicone coating solution which becomes the silicone resin layer 14.

Here, as described above, when the porous support is coated with the silicone coati solution in order to form a silicone resin layer, there is a concern that the silicone coating solution may infiltrate into the porous support. Due to the infiltration of the silicone coating solution, an appropriate silicone resin layer cannot be formed on the surface of the porous support. Further, inconvenience in which the formed silicone resin layer enters the porous support because of degradation of the pressure resistance of the silicone resin layer may occur.

It is considered that the infiltration of the silicone coating solution into the porous support can be prevented by increasing the viscosity of the silicone coating solution or raising the conveying speed of the porous support (shortening the time taken for the silicone coating solution to be cured).

However, when the surface of the porous support having a two-layer structure formed by laminating the porous film and the auxiliary support film on each other is coated with the silicone coating solution with high viscosity at a high conveying speed, there is a problem in that the porous film and the auxiliary support film are peeled off because the porous film is pulled by the coating solution.

Meanwhile, in the production method of the present invention, during application of the silicone coating solution, the conveying speed of the porous support 12 is set to be in a range of 1 m/min to 200 m/min, the viscosity of the silicone coating solution is set to be in a range of 100 cP to 1000000 cP, and the peel force between the porous film 12a and the auxiliary support film 12b is set to 10 mN/mm or greater.

When the conveying speed of the support 12 and the viscosity of the silicone coating solution are respectively set to be in the above-described range, it is possible to prevent the silicone coating solution from infiltrating into the porous support and to form the appropriate silicone resin layer 14.

Moreover, when the conveying speed of the support 12 and the viscosity of the silicone coating solution are respectively set to be in the above-described range and the peel force between the porous film 12a and the auxiliary support film 12b is set to 10 mN/mm or greater, during the application of the silicone coating solution which becomes the silicone resin layer 14, it is possible to prevent the porous film 12a and the auxiliary support film 12b from being peeled off and to form the appropriate silicone resin layer 14.

Accordingly, when the composite 10 on which the appropriate silicone resin layer is formed is prepared and the acidic gas separation layer 16 is formed on the composite 10, it is possible to prevent the acidic gas separation layer 16 from entering the porous support 12 and to prevent degradation of performance of separating out acidic gas.

Here, in the present invention, the peel force between the porous film 12a and the auxiliary support film 12b is defined to be measured according to a peeling test at a pulling rate of 10 m/min with reference to a 180° peeling test (JIS Z0237) using a tensile strength tester.

Moreover, from the viewpoint of preventing the peeling, the peel force between the porous film 12a and the auxiliary support film 12b is 10 mN/mm or greater and more preferably 15 mN/mm or greater.

Further, when the peel force (adhesion strength) between the porous film 12a and the auxiliary support film 12b is extremely high, a defect may occur in the porous film 12a at the time of bonding or curling (deformation) may occur due to the influence of residual stress. The upper limit of the peel force between the porous film 12a and the auxiliary support film 12b may be appropriately determined by considering materials of the porous film 12a and the auxiliary support film 12b, the thickness thereof, and the like. Specifically, the peel force between the porous film 12a and the auxiliary support film 12b is preferably 500 mN/mm or less and more preferably 400 mN/mm or less.

Further, as a method of bonding the porous film 12a and the auxiliary support film 12b to each other, a bonding method using thermocompression or a bonding method using an adhesive can be used. From the viewpoints of securing gas permeability and using these in a hot and humid environment, a bonding method using thermocompression is preferably used.

As the thermocompression bonding method, various known thermocompression bonding methods can be used. For example, a method of conveying a long porous film and an auxiliary support film to a predetermined conveying path to pass through the space between nip rollers whose temperature is controlled, and pressing the porous film and the auxiliary support film laminated on each other to be bonded to each other can be used. At this time, the peel force between the porous film 12a and the auxiliary support film 12b can be adjusted by adjusting the temperature during compression, the pressure, and the conveying speed (time for compression).

In addition, the average pore size of pores of the porous film 12a is preferably 5 μm or less, more preferably in a range of 0.01 μm to 1 μm, and particularly preferably in a range of 0.01 μm to 0.3 μm.

When the average pore size of the porous film 12a is in the above-described range, it is possible to suitably prevent the porous film 12a from blocking the passage of acidic gas and prevent the film surface thereof from being non-uniform due to the capillary phenomenon or the like when the film surface is coated with the silicone coating solution described below.

The support 12 fed from the support roll 12R is subsequently conveyed to the coating unit 26 and coated with the silicone coating solution which becomes the silicone resin layer 14 while being conveyed in the longitudinal direction.

In the example illustrated in the figure, the coating unit 26 is configured to include a coating device 32 and a backup roller 34. The support 12 is conveyed in the longitudinal direction while being supported by the backup roller 34 in a predetermined position, and the surface of the porous film 12a is coated with the silicone coating solution.

As described above, from the viewpoint of preventing the infiltration of the silicone coating solution and uniformly applying the silicone coating solution, it is preferable that the conveying speed of the support 12 is in a range of 0.5 m/min to 200 m/min, more preferably in a range of 1 m/min to 200 m/min, and particularly preferably in a range of 1 m/min to 100 m/min.

The silicone resin layer 14 is a layer consisting of a compound having a so-called silicone bond and a silicone-containing compound. Specific examples thereof include layers formed of a silicone resin having gas permeability, for example, linear silicone such as polydimethylsiloxane (PDMS), polymethylphenylsiloxane, or polymethyl hydrogen siloxane; modified silicone obtained by introducing an amino group, an epoxy group, or a halogenated alkyl group to the side chain; and silicon-containing polyacetylene such as polytrimethyl silyl propyne. Among these, PDMS or modified silicone of PDMS is preferably exemplified.

Accordingly, the silicone coating solution used to form the silicone resin layer 14 contains a monomer, a dimer, a trimer, an oligomer, a prepolymer of a compound which becomes the silicone resin layer, or a mixture of these; a curing agent, a curing accelerator, a crosslinking agent, a thickener, a reinforcing agent, and a filler.

Further, it is preferable that the silicone coating solution does not usually include an organic solvent used to form such a resin layer.

It is preferable that the silicone coating solution does not include an organic solvent from the viewpoint that the process of drying the silicone coating solution becomes unnecessary, curing of a monomer and the like can be performed immediately after the silicone coating solution is applied, the viscosity of the silicone coating solution can be easily adjusted to 100 cP or greater, and production equipment can be simplified (neutralization equipment or explosion-proof equipment can be unnecessary).

Moreover, according to the production method of the present invention, the viscosity of the silicone coating solution at the time of application may be obtained by measuring the viscosity at a rotation speed of 60 rpm with a B-type viscometer or a viscometer similar to the B-type viscometer using a method in conformity with JIS Z8803 under the condition in which the temperature of the silicone coating solution is used as the temperature at the time of application.

As described above, the acidic gas separation film having a facilitated transport film has a problem of durability because the soft gel-like facilitated transport film enters the porous support according to the use thereof. Meanwhile, as disclosed in JP1987-140620A (JP-S62-140620A), by forming a silicone resin layer on the surface of the porous support and forming a facilitated transport film on the surface of the silicone resin layer, it is possible to prevent the facilitated transport film from entering the porous support.

However, the silicone resin layer is typically formed by coating the porous support with a coating solution, which becomes a silicone resin and contains a monomer and the like, and curing the porous support. For this reason, the coating solution infiltrates into the porous support when the porous support is coated with the coating solution. Therefore, a suitable silicone resin layer cannot be formed on the surface of the porous support.

As a result, despite the formation of the silicone resin layer on the surface of the porous support, it is not possible to sufficiently prevent the facilitated transport film from entering the porous support and to improve the durability of the acidic gas separation film.

It is considered that the infiltration of the silicone coating solution into the porous support is prevented by increasing the viscosity of the silicone coating solution and raising the conveying speed of the porous support (shortening the time taken for the silicone coating solution to be cured).

However, when the surface of the porous support having a two-layer structure formed by laminating the porous film and the auxiliary support film on each other is coated with the silicone coating solution with high viscosity at a high conveying speed, there is a problem in that the porous film and the auxiliary support film are peeled off because the porous film is pulled by the coating solution.

Meanwhile, in the production method of the present invention, as described above, the viscosity at the time of coating is set to be in a range of 100 cP to 1000000 cP and the conveying speed of the support 12 is set to be in a range of 0.5 m/min to 200 m/min using the support 12 in which the peel force between the porous film 12a and the auxiliary support film 12b is 10 mN/mm or greater, and the surface of the porous film 12a is coated with the silicone coating solution to form the silicone resin layer 14 according to the RtoR system.

Therefore, according to the production method of the present invention, the surface of the porous film 12a is coated with the silicone coating solution while the peeling of the porous film 12a and the auxiliary support film 12b is prevented, and the dense (non-porous) silicone resin layer 14 can be formed on the surface of the porous film 12a by suitably preventing (suppressing) the infiltration of the silicone coating solution, which is applied to the surface of the porous film 12a, into the porous film 12a. Therefore, when the acidic gas separation layer 16 is formed on the surface of the silicone resin layer 14 using the composite 10 according to the production method of the present invention, it is possible to prevent the acidic gas separation layer 16 from entering the porous film 12a (support 12) and to obtain an acidic gas separation film 18 having excellent durability.

In the production method of the present invention, if the viscosity of the silicone coating solution when applied to the porous film 12a is less than 100 cP, a problem that the effect of preventing infiltration of the silicone coating solution into the porous film 12a cannot be sufficiently obtained occurs.

Accordingly, the viscosity of the silicone coating solution when applied to the porous film 12a is in a range of 100 cP to 1000000 cP, preferably in a range of 300 cP to 1000000 cP, and more preferably in a range of 400 cP to 1000000 cP.

From the viewpoints that a more suitable effect of preventing the infiltration of the silicone coating solution can be obtained, a uniform silicone coating layer can be obtained, and the peeling of the porous film 12a and the auxiliary support film 12b can be prevented, it is preferable that the viscosity of the silicone coating solution is in the above-described range.

Further, the viscosity of the silicone coating solution when applied to the porous film 12a may be set to a value or less, in which the silicone coating solution can be appropriately applied thereto, basically according to a coating device being used.

Moreover, the viscosity of the silicone coating solution when applied to the porous film 12a may be controlled using a known method, for example, adjustment of the composition of the coating solution such as addition of a thickener or adjustment of the amount of an organic solvent to be added (as described above, it is preferable that an organic solvent is not used); adjustment of the temperature of the silicone coating solution such as heating or cooling; mixture of silicone resins having viscosities different from each other; or adjustment of the molecular weight through partial crosslinking of a silicone resin.

Here, the amount of the silicone coating solution to infiltrate into the porous film 12a is determined according to the time taken for the silicone coating solution to be cured from the application, the viscosity of the silicone coating solution, the pore diameter of the porous film 12a, and the like. Consequently, from the viewpoint of preventing the infiltration of the silicone coating solution into the porous film 12a, the time taken for the silicone coating solution to be cured from the application may be suitably determined according to the material of the silicone coating solution, the pore diameter of the porous film 12a, and the like. Specifically, the time taken for the silicone coating solution to be cured from the application is preferably within 7 seconds.

In addition, the time taken for the silicone coating solution to be cured from the application is determined according to the conveying speed of the support (time for conveying the support from the coating unit 26 to the curing device 28), the viscosity of the silicone coating solution, the coating thickness, the material, the performance of the curing device 28, and the like. Accordingly, the time taken for the silicone coating solution to be cured from the application can be adjusted by adjusting the conveying speed of the support, the viscosity of the silicone coating solution, the coating thickness, the material, the performance of the curing device 28, and the like.

As described above, the coating unit 26 includes a coating device 32 and a backup roller 34.

The support 12 is conveyed in the longitudinal direction while being positioned in a predetermined coating position by the backup roller 34, and the surface of the porous film 12a is coated with the silicone coating solution by the coating device 32, thereby forming a coating film (liquid film) of the coating solution.

Further, in the coating unit 26, the temperature of the silicone coating solution or the support 12 may be controlled as needed.

As the coating device 32, various known devices can be used.

Specific examples thereof include a roll coater, a direct gravure coater, an offset gravure coater, a one-roll kiss coater, a three reverse roll coater, a positive rotation roll coater, a curtain flow coater, an extrusion die coater, an air doctor coater, a blade coater, a rod coater, a knife coater, a squeeze coater, a reverse roll coater, and a bar coater.

Among these, from the viewpoints of controlling the viscosity of the silicone coating solution, the amount of the silicone coating solution to be applied, and the infiltration amount of the silicone resin, a roll coater, a direct gravure coater, an offset gravure coater, a one-roll kiss coater, a three reverse roll coater, a positive rotation roll coater, a squeeze coater, or a reverse roll coater is preferably used.

The surface of the porous film 12a is coated with the silicone coating solution using the coating device 32 such that the film thickness of the silicone resin layer 14 to be formed by being cured is 10 μm or less. In other words, in the production method of the present invention, the film thickness of the silicone resin layer 14 to be formed is preferably 10 μm or less.

Further, in the present invention, the film thickness of the silicone resin layer 14 indicates the film thickness of the silicone resin layer 14 formed on the surface of the porous film 12a (on the porous film 12a) without the thickness of the silicone resin layer having infiltrated into the porous film 12a.

From the viewpoint that degradation of gas permeability due to the silicone resin layer 14 can be suitably prevented, it is preferable that the film thickness of the silicone resin layer 14 is adjusted to be 10 μm or less.

From this viewpoint, the film thickness of the silicone resin layer 14 is more preferably 5 μm or less.

In addition, the silicone resin layer 14 may be thin if a dense film entirely covers the surface of the porous film 12a without any space left.

From this viewpoint, the film thickness of the silicone resin layer 14 is preferably 0.01 μm or greater. When the film thickness of the silicone resin layer 14 is set to be 0.01 μm or greater, the composite 10 in which the surface of the porous film 12a is suitably covered with the dense silicone resin layer 14 and entering of the facilitated transport film into the porous film 12a can be more suitably prevented can be obtained.

Further, in consideration of the infiltration of the silicone coating solution into the porous film 12a described below, the film thickness of the silicone resin layer 14 may be controlled by performing an experiment or simulation in advance.

The support 12 coated with the silicone coating solution in the coating unit 26 is subsequently conveyed to the curing device 28 (drying process). Preferably, the curing device 28 is arranged right behind (immediately downstream) the coating unit 26 in a direction in which the support is conveyed.

The silicone coating solution is cured (monomer or the like is cross-linked) by the curing device 28 while the support 12 is conveyed in the longitudinal direction to obtain the composite 10 in which the silicone resin layer 14 is formed on the surface of the support 12 (porous film 12a).

The silicone coating solution may be cured by the curing device 28 appropriately using a method that is capable of curing the silicone coating solution according to the type of monomer or the like included in the silicone coating solution.

Specifically, irradiation with ultraviolet rays, irradiation with electron beams, heating, or humidification is exemplified.

Among these, due to the reasons that curling (deformation) of the support 12 can be prevented and deterioration of a resin constituting the support 12 can be prevented, it is preferable that the silicone coating solution is cured by performing irradiation with ultraviolet rays or heating for a short period of time and particularly preferable that the silicone coating solution is cured by performing irradiation with ultraviolet rays. In other words, according to the production method of the present invention, it is preferable that the silicone resin layer 14 is formed by the silicone coating solution using a monomer or the like which can be cured by performing irradiation with ultraviolet rays.

Moreover, the silicone coating solution may be cured in an inert atmosphere, for example, a nitrogen atmosphere, if necessary.

Here, in the production method of the present invention, from the viewpoint of infiltration of the silicone coating solution, it is preferable that the silicone coating solution is cured within 7 seconds after the silicone coating solution is applied to form the silicone resin layer 14.

According to the production method of the present invention, when the conveying speed of the support 12 is adjusted to be in a range of 0.5 m/min to 200 m/min using the RtoR system, the silicone coating solution can be cured in a short period of time by shortening the time taken for conveying the support 12 from the coating unit 26 to the curing device 28 after the silicone coating solution is applied.

The composite 10 in which the silicone coating solution is cured by the curing device 28 to form the silicone resin layer 14 is guided by pass rollers 38a, 38b, 38c, and 38d and conveyed to the winding unit 30.

Further, the pass rollers 38b, 38c, and 38d act as a tension cutter and the composite 10 is guided thereto such that the composite meanders.

The composite roll 10R is obtained by winding the composite 10 using the winding unit 30, and the winding unit 30 includes a pass roller 38e and a winding shaft 40.

The composite 10 conveyed to the winding unit 30 is guided to the winding shaft 40 by the pass roller 38e and is wound around the winding shaft 40, thereby obtaining the composite roll 10R.

Figure 1B:
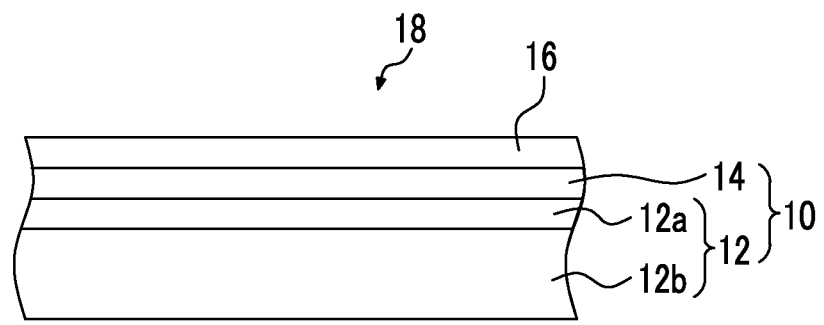

According to the method of producing a composite of the present invention, the surface of the support 12 is coated with the silicone coating solution and then cured, and the silicone resin layer 14 is formed thereon. Preferably, the surface of the silicone resin layer 14 is further coated with a coating composition which becomes an acidic gas separation layer 16, and the acidic gas separation layer 16 is formed, thereby obtaining an acidic gas separation film 18 illustrated in FIG. 1B.

Moreover, according to the production method of the present invention, after the silicone resin layer 14 is formed, the surface of the support 12 (surface of the auxiliary support film 12b on which the silicone resin layer 14 is not formed) may be coated with a coating composition which becomes the acidic gas separation layer 16 to form the acidic gas separation layer 16 in the same manner as described below, without forming the acidic gas separation layer 16 on the surface of the silicone resin layer 14.

Figure 3:
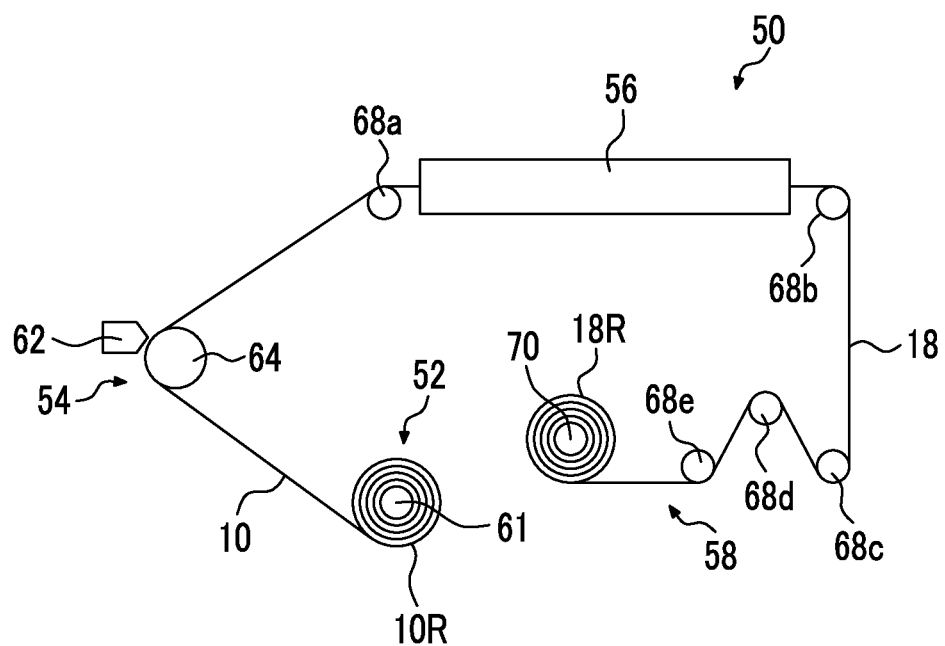
FIG. 3 is a view schematically illustrating an example of a production apparatus that performs another process of the method of producing a composite according to the present invention.

FIG. 3 schematically illustrates an example of a production apparatus that forms the acidic gas separation layer 16 on the surface of the composite 10 (the silicone resin layer 14 or the support 12) according to the production method of the present invention. In addition, an example in which the acidic gas separation layer 16 is formed on the surface of the silicone resin layer 14 is described below.

The production method of the present invention is performed using the RtoR system even when the acidic gas separation layer 16 is formed on the surface of the silicone resin layer 14. Accordingly, a production apparatus 50 illustrated in FIG. 3 also feeds the composite 10 from the composite roll 10R formed by winding the long composite 10 and coats the silicone resin layer 14 with the coating composition which become the acidic gas separation layer 16 while conveying the composite 10 in the longitudinal direction. Next, the coating composition is dried and the acidic gas separation layer 16 is formed by the production apparatus 50 to obtain the acidic gas separation film 18 which is a kind of the composite produced according to the production method of the present invention. Moreover, the production apparatus 50 winds the prepared acidic gas separation film 18 in a roll shape to obtain a separation film roll 18R.

Such a production apparatus 50 basically includes a supply unit 52, a coating unit 54, a drying device 56, and a winding unit 58.

In addition, similar to the production apparatus 20 described above, the production apparatus 50 may include various members provided for an apparatus that produces a functional film according to the RtoR system, for example, pass rollers or various sensors, if necessary, in addition to the members illustrated in the figures.

The supply unit 52 is a portion in which the composite 10 is fed by loading the composite roll 10R formed by winding the composite 10 in a roll shape to a rotary shaft 61 when the acidic gas separation layer 16 is formed on the composite 10 and rotating the rotary shaft 61, that is, the composite roll 10R.

In addition, similar to the production apparatus 20 described above, the composite 10 may be fed and conveyed according to a known method.

The composite 10 fed from the composite roll 10R is conveyed in the longitudinal direction and conveyed to the coating unit 54, and then the surface thereof is coated with the coating composition which becomes the acidic gas separation layer 16.

In the example illustrated in the figure, the coating unit 54 includes a coating device 62 and a backup roller 64. The composite 10 is conveyed in the longitudinal direction while being supported by the backup roller 64 in a predetermined position and the surface of the silicone resin layer 14 is coated with the coating composition.

In the production method of the present invention, the conveying speed of the composite 10 when the acidic gas separation layer 16 is formed may be appropriately set according to the type of the composite 10 or the viscosity of the coating composition.

Here, when the conveying speed of the composite 10 is excessively high, the uniformity in film thickness of the coating film of the coating composition may be degraded or the coating composition may be insufficiently dried. On the contrary, when the conveying speed thereof is excessively low, the productivity is degraded. From this viewpoint, the conveying speed of the composite 10 is preferably 0.5 m/min or greater, more preferably in a range of 0.75 m/min to 200 m/min, and particularly preferably in a range of 1 m/min to 200 m/min.

In the present invention, a facilitated transport film is preferably used as the acidic gas separation layer 16.

The facilitated transport film is frequently a gel film which is extremely soft (low viscosity) or a film having low viscosity. Therefore, the acidic gas separation film using the facilitated transport film has low durability because the separation layer easily enters the porous support during the production or use.

Therefore, the composite 10 produced according to the production method of the present invention, which is capable of suitably forming the silicone resin layer used to prevent the acidic gas separation layer from entering the support can be preferably used as the support of the facilitated transport film.

The facilitated transport film contains a hydrophilic compound such as a hydrophilic polymer, a carrier reacting with acidic gas, and water.

Accordingly, the coating composition used to form such a facilitated transport film is a composition (a coating material or a coating solution) that contains a hydrophilic compound, a carrier, water (room temperature water or hot water), or a necessary component such as a crosslinking agent. Further, the hydrophilic compound may be cross-linked, partially cross-linked, or uncrosslinked, and a mixture of these may be used.

The hydrophilic compound functions as a binder, holds moisture in the facilitated transport film, and exhibits a function of separating out gas such as carbon dioxide using a carrier. Moreover, it is preferable that the hydrophilic compound has a cross-linked structure from a viewpoint of heat resistance.

A hydrophilic compound having high hydrophilicity is preferable from viewpoints that the hydrophilic compound is dissolved in water and capable of forming a coating solution and it is preferable that the facilitated transport film has high hydrophilicity (moisture-retaining properties).

Specifically, the hydrophilic compound has a hydrophilicity at which the amount of water able to be absorbed of physiological saline is preferably 0.5 g/g or greater, more preferably 1 g/g or greater, still more preferably 5 g/g or greater, particularly preferably 10 g/g or greater, and most preferably 20 g/g or greater.

The weight average molecular weight of the hydrophilic compound may be appropriately selected within the range in which a stable film can be formed. Specifically, the weight average molecular weight thereof is preferably 20,000 to 2,000,000, more preferably 25,000 to 2,000,000, and particularly preferably 30,000 to 2,000,000.

By adjusting the weight average molecular weight of the hydrophilic compound to be 20,000 or greater, the facilitated transport film which is stabilized and has sufficient film strength can be obtained.

Particularly, in a case where the hydrophilic compound includes —OH as a crosslinkable group, the weight average molecular weight of the hydrophilic compound is preferably 30,000 or greater. At this time, the weight average molecular weight thereof is more preferably 40,000 or greater and still more preferably 50,000 or greater. Further, in the case where the hydrophilic compound includes —OH as a crosslinkable group, the weight average molecular weight thereof is preferably 6,000,000 or less from a viewpoint of production suitability.

In addition, in a case where the hydrophilic compound includes —NH—, as a crosslinkable group, the weight average molecular weight of the hydrophilic compound is preferably 10,000 or greater. At this time, the weight average molecular weight of the hydrophilic compound is more preferably 15,000 or greater and particularly preferably 20,000 or greater. Further, in the case where the hydrophilic compound includes —NH, as a crosslinkable group, the weight average molecular weight thereof is preferably 1,000,000 or less from a viewpoint of production suitability.

Further, a value measured in conformity with JIS K6726 may be used as the weight average molecular weight of the hydrophilic compound in a case where PVA is used as the hydrophilic compound. In addition, when a commercially available product is used, the molecular weight known by a catalog or a specification may be used.

As a crosslinkable group that forms a hydrophilic compound, one which can form a hydrolysis-resistant cross-linked structure is preferably selected.

Specific examples thereof include a hydroxy group, an amino group, a chlorine atom, a cyano group, a carboxy group, and an epoxy group. Among these, an amino group and a hydroxy group are preferable. Further, from viewpoints of affinity for a carrier and an effect of carrying a carrier, a hydroxy group is most preferable.

Specific examples of the hydrophilic compound which has a single crosslinkable group include polyallylamine, polyacrylic acid, polyvinyl alcohol, polyvinyl pyrrolidone, polyacrylamide, polyethyleneimine, polyvinylamine, poly-ornithine, polylysine, polyethylene oxide, water-soluble cellulose, starch, alginic acid, chitin, polysulfonic acid, polyhydroxy methacrylate, and poly-N-vinylacetamide. Polyvinyl alcohol is most preferable. In addition, as the hydrophilic compound, a copolymer of these may be exemplified.

Further, examples of the hydrophilic compound having a plurality of crosslinkable groups include a polyvinyl alcohol-polyacrylic acid copolymer. A polyvinyl alcohol-polyacrylic salt copolymer has high water absorption performance and high hydrogel strength at the time of high water absorption, which is preferable.

The content ratio of polyacrylic acid in the polyvinyl alcohol-polyacrylic acid copolymer is in a range of 1% by mole to 95% by mole, preferably in a range of 2% by mole to 70% by mole, more preferably in a range of 3% by mole to 60% by mole, and particularly preferably in a range of 5% by mole to 50% by mole. Further, the content ratio of the acrylic acid can be controlled using a known synthesis method.

In addition, in the polyvinyl alcohol-polyacrylic acid copolymer, there may be a salt of polyacrylic acid. As the polyacrylate at this time, an ammonium salt or an organic ammonium salt may be exemplified in addition to an alkali metal salt such as a sodium salt or a potassium salt.

The polyvinyl alcohol is commercially available. Specific examples thereof include PVA117 (manufactured by KURARAY CO., LTD.), POVAL (manufactured by KURARAY CO., LTD.), polyvinyl alcohol (manufactured by Sigma-Aldrich Co. LLC.), and J-POVAL (manufactured by JAPAN VAM & POVAL CO., LTD.). The range of the molecular weight varies, but a product having a weight average molecular weight of 130,000 to 300,000 is preferable.

The polyvinyl alcohol-polyacrylate copolymer (sodium salt) may be a commercially available product. For example, KURASTOMER AP20 (manufactured by KURARAY CO., LTD.) is exemplified.

Moreover, in the production method of the present invention, hydrophilic compounds of the facilitated transport film may be used in a mixture of two or more kinds thereof.

The content of the hydrophilic compound in the coating composition may be determined by appropriately setting the amount thereof in which the hydrophilic compound can function as a binder in the formed facilitated transport film and which can sufficiently hold moisture according to the kind of hydrophilic composition or carrier.

Specifically, the content thereof in the facilitated transport film is preferably in a range of 0.5% by mass to 50% by mass, more preferably in a range of 0.75% by mass to 30% by mass, and particularly preferably in a range of 1% by mass to 15% by mass. When the content of the hydrophilic compound is in the above-described range, the function as a binder and the function of holding moisture described above can be stably and suitably exhibited.

The cross-linked structure of the hydrophilic compound can be formed using a known method, for example, thermal crosslinking, ultraviolet crosslinking, electron beam crosslinking, radiation crosslinking, or photocrosslinking.

Photocrosslinking or thermal crosslinking is preferable and thermal crosslinking is most preferable.

It is preferable that the coating composition contains a crosslinking agent.

As the crosslinking agent, a crosslinking agent including two or more functional groups which react with a hydrophilic compound and are capable of performing crosslinking such as thermal crosslinking or photocrosslinking is selected. Further, it is preferable that the cross-linked structure to be formed is a hydrolysis-resistant cross-linked structure.

From this viewpoint, preferred examples of the crosslinking agent to be added to the coating composition include an epoxy crosslinking agent, a polyvalent glycidyl ether, a polyhydric alcohol, a polyvalent isocyanate, a polyvalent aziridine, a haloepoxy compound, a polyvalent aldehyde, a polyvalent amine, and an organic metal-based crosslinking agent. A polyvalent aldehyde, an organic metal-based crosslinking agent, and an epoxy crosslinking agent are more preferable. Among these, a polyvalent aldehyde such as glutaraldehyde or formaldehyde having two or more aldehyde groups is preferable.

As the epoxy crosslinking agent, a compound including two or more epoxy groups may be exemplified and a compound including four or more epoxy groups is preferable. The epoxy crosslinking agent is also commercially available and examples thereof include trimethylolpropane triglycidyl ether (EPOLIGHT 100MF or the like, manufactured by KYOEISHA CHEMICAL Co., LTD.), EX-411, EX-313, EX-614B, EX-810, EX-811, EX-821, EX-830, (all manufactured by Nagase Chemtex Corporation), and EPIOL E400 (manufactured by NOF CORPORATION).

In addition, as a compound similar to an epoxy crosslinking agent, an oxetane compound having a cyclic ether is preferably used. A polyvalent glycidyl ether having two or more functional groups is preferable as an oxetane compound. Examples of commercially available products thereof include EX-411, EX-313, EX-614B, EX-810, EX-811, EX-821, and EX-830 (all manufactured by Nagase Chemtex Corporation).

Examples of the polyvalent glycidyl ether include ethylene glycol diglycidyl ether, polyethylene glycol diglycidyl ether, glycerol polyglycidyl ether, digylcerol polyglycidyl ether, polyglycerol polyglycidyl ether, sorbitol polyglycidyl ether, pentaerythritol polyglycidyl ether, propylene glycol glycidyl ether, and polypropylene glycol diglycidyl ether.

Examples of the polyhydric alcohol include ethylene glycol, diethylene glycol, triethylene glycol, tetraethylene glycol, polyethylene glycol, glycerin, polyglycerin, propylene glycol, diethanolamine, triethanolamine, polyoxypropyl, an oxyethylene-oxypropylene block copolymer, pentaerythritol, and sorbitol.

Examples of the polyvalent isocyanate include 2,4-toluylene diisocyanate and hexamethylene diisocyanate.

Examples of the polyvalent aziridine include 2,2-bishydroxymethylbutanol-tris[3-(1-aziridinyl)propionate], 1,6-hexamethylene diethylene urea, and diphenylmethane-bis-4,4'-N,N'-diethylene urea.

Examples of the haloepoxy compound include epichlorohydrin and α-methylchlorohydrin.

Examples of the polyvalent aldehyde include glutaraldehyde and glyoxal.

Examples of the polyvalent amine include ethylenediamine, diethylenetriamine, triethylenetetramine, tetraethylenepentamine, pentaethylenehexamine, and polyethyleneimine.

Further, examples of the organic metal-based crosslinking agent include an organic titanium crosslinking agent and an organic zirconia crosslinking agent.

For example, in a case where a polyvinyl alcohol having a weight average molecular weight of 130,000 or greater is used as a hydrophilic compound, an epoxy crosslinking agent or glutaraldehyde is preferably used in terms of excellent reactivity with the hydrophilic compound and capability of forming a cross-linked structure having excellent hydrolysis resistance.

Further, in a case where a polyvinyl alcohol-polyacrylic acid copolymer is used as a hydrophilic compound, an epoxy crosslinking agent or glutaraldehyde is preferably used.

Further, in a case where a polyallylamine having a weight average molecular weight of 10,000 or greater is used as a hydrophilic compound, an epoxy crosslinking agent, glutaraldehyde, or an organic metal crosslinking agent is preferably used in terms of excellent reactivity with the hydrophilic compound and capability of forming a cross-linked structure having excellent hydrolysis resistance.

Further, in a case where a polyethyleneimine or polyallylamine is used as a hydrophilic compound, an epoxy crosslinking agent is preferably used.

The amount of a crosslinking agent may be appropriately set according to the type of hydrophilic compound or crosslinking agent used to be added to the coating composition.

Specifically, the amount thereof is preferably in a range of 0.001 parts by mass to 80 parts by mass, more preferably 0.01 parts by mass to 60 parts by mass, and particularly preferably 0.1 parts by mass to 50 parts by mass with respect to 100 parts by mass of a crosslinkable group included in the hydrophilic compound. When the content of the crosslinking agent is adjusted to be in the above-described range, the formation properties of the cross-linked structure become excellent and a facilitated transport film with excellent shape-maintaining properties can be obtained.

When the crosslinkable group included in the hydrophilic compound is considered, it is preferable that the cross-linked structure is formed by reacting 0.001 mol to 80 mol of a crosslinking agent with 100 mol of the crosslinkable group included in the hydrophilic compound.

In the facilitated transport film, the carrier (acidic gas carrier) reacts with acidic gas (for example, carbon dioxide ($CO_2$)) and transports the acidic gas.

The carrier may be a water-soluble compound which has affinity for acidic gas and shows basicity. Specific examples thereof include an alkali metal compound, a nitrogen-containing compound, and a sulfur compound.

Moreover, a carrier may indirectly react with acidic gas or the carrier itself may directly react with acidic gas.

Examples of the former include carriers which react with another gas contained in a supply gas and show basicity and in which a basic compound thereof reacts with acidic gas. More specifically, the former is a compound which is capable of selectively taking $CO_2$ into the facilitated transport film, for example, an alkali metal compound by reacting with steam (moisture) to release OH— and allowing OH— to react with $CO_2$.

Examples of the latter include a nitrogen-containing compound and a sulfur oxide in which a carrier has basicity.

Examples of the alkali metal compound include alkali metal carbonates, alkali metal bicarbonates, and an alkali metal hydroxides. Here, an alkali metal element selected from cesium, rubidium, potassium, lithium, and sodium is preferably used as an alkali metal. Moreover, in the present invention, the alkali metal compound includes salts and ions thereof in addition to an alkali metal.

Examples of the alkali metal carbonate include lithium carbonate, sodium carbonate, potassium carbonate, rubidium carbonate, and cesium carbonate.

Examples of the alkali metal bicarbonate include lithium hydrogencarbonate, sodium hydrogencarbonate, potassium hydrogencarbonate, rubidium hydrogencarbonate, and cesium hydrogencarbonate.

Examples of the alkali metal hydroxide include lithium hydroxide, sodium hydroxide, potassium hydroxide, rubidium hydroxide, and cesium hydroxide.

Among these, an alkali metal carbonate is preferable, and a compound containing potassium, rubidium, and cesium which have high solubility in water are preferable from a viewpoint of excellent affinity for acidic gas.

In addition, when an alkali metal compound is used as a carrier, two or more kinds of carriers may be used in combination.

When two or more kinds of carriers are present in the facilitated transport film, different kinds of carriers in the film can be separated from each other. In this manner, adhesion (blocking) of the facilitated transport films to each other or adhesion of the facilitated transport film to another member, caused by water-absorbing properties of the facilitated transport film, can be suitably suppressed at the time of production or the like due to a difference in deliquescency among a plurality of carriers.

In addition, in terms that the effect of suppressing blocking can be more suitably obtained, in a case where two or more kinds of alkali metal compounds are used as carriers, it is preferable that a first compound having deliquescency and a second compound having less deliquescency and a smaller specific gravity than those of the first compound are included. As an example, cesium carbonate is exemplified as the first compound and potassium carbonate is exemplified as the second compound.

As the nitrogen-containing compounds, amino acids such as glycine, alanine, serine, proline, histidine, taurine, and diaminopropionic acid; hetero compounds such as pyridine, histidine, piperazine, imidazole, and triazine; alkanolamines such as monoethanolamine, diethanolamine, triethanolamine, monopropanolamine, dipropanolamine, and tripropanolamine; cyclic polyether amines such as cryptand [2.1] and cryptand[2.2]; bicyclic polyether amines such as cryptand[2.2.1] and cryptand[2.2.2]; porphyrin; phthalocyanine; and ethylenediaminetetraacetic acid can be used.

As sulfur compounds, amino acids such as cystine and cysteine; polythiophene; and dodecylthiol can be used.

The content of carriers in the coating composition may be appropriately set according to the type of carrier and hydrophilic compound. Specifically, the amount of carriers in the facilitated transport film is preferably in a range of 0.3% by mass to 30% by mass, more preferably in a range of 0.5% by mass to 25% by mass, and particularly preferably in a range of 1% by mass to 20% by mass.

When the content of the carriers in the coating composition is in the above-described range, salting-out before application can be suitably prevented. Further, the formed facilitated transport film can reliably exhibit the function of separating out acidic gas.

Moreover, the amount ratio of the hydrophilic compound to the carrier in the coating composition is preferably in a range of 1:9 to 2:3, more preferably in a range of 1:4 to 2:3, and particularly preferably in a range of 3:7 to 2:3 in terms of the mass ratio of the hydrophilic compound to the carrier.

The coating composition may contain a thickener as needed.

Preferred examples of the thickener include polysaccharide thickeners such as agar, carboxymethyl cellulose, carrageenan, xanthan gum, guar gum, and pectin. Among these, from the viewpoints of film-forming properties, availability, and the cost, carboxymethyl cellulose is preferable.

When carboxymethyl cellulose is used, a coating composition having a desired viscosity can be easily obtained with a small content thereof and at least a part of the components other than a solvent contained in the coating solution is less likely to be deposited without being dissolved in the coating solution.

It is preferable that the content of the thickener in the coating composition (coating solution) is as small as possible if the viscosity can be adjusted to a target viscosity.

As a general indicator, the content thereof is preferably 10% by mass or less, more preferably 0.1% by mass to 5% by mass, and still more preferably 0.1% by mass to 2% by mass.

The coating composition (facilitated transport film) may contain various components as needed in addition to such a hydrophilic compound, a crosslinking agent, a carrier, and a thickener.

Examples of such a component include an antioxidant such as dibutylhydroxytoluene (BHT); a specific compound such as a compound which includes an alkyl group having 3 to 20 carbon atoms or a fluorinated alkyl compound having 3 to 20 carbon atoms and a hydrophilic group, or a compound having a siloxane structure; a surfactant such as sodium octanate or sodium 1-hexasulfonate; and polymer particles such as polyolefin particles or polymethyl methacrylate particles.

In addition, if necessary, a catalyst, a moisturizing agent (moisture absorbent), a co-solvent, a film strength control agent, or a defect detection agent may be used.

The coating composition may be prepared using a known method. That is, first, a coating composition which becomes the facilitated transport film can be prepared by adding respectively appropriate amounts of a hydrophilic compound, a carrier, and various components to be added if necessary to water (room temperature water or hot water) and sufficiently stirring the solution.

In the preparation of the coating composition, dissolution of each component may be promoted by stirring and heating the solution if necessary. In addition, after a hydrophilic compound is added to water and dissolved therein, deposition (salting-out) of the hydrophilic compound can be effectively prevented by gradually adding a carrier to the solution and stirring the same.

Here, it is preferable that the viscosity of the coating composition which becomes the facilitated transport film at 25° C. is 100 cP or greater.

From the viewpoints that repelling at the time of coating the silicone resin layer 14 with the coating composition can be suppressed and the coating uniformity of the coating composition can be improved, it is preferable that the viscosity of the coating composition at 25° C. is 100 cP or greater.

Further, the viscosity of the coating composition may be measured in the same manner as that of the silicone coating solution described above.

As described above, the coating unit 54 is a portion that coats the composite 10 (silicone resin layer 14) conveyed in the longitudinal direction with such a coating composition.

In the example illustrated in the figure, the coating unit 54 is configured of the coating device 62 and the backup roller 64. That is, the composite 10 is conveyed while being held in a predetermined coating position by the backup roller 64 and is coated with the coating composition by the coating device 62 to form a coating film (liquid film) of the coating composition. In the coating unit 54, the temperature of the coating composition or the composite 10 may be controlled as needed.

Various known devices can be used as the coating device 62, and examples thereof are the same as those of the coating device 32 described above. Further, in consideration of the preferred viscosity of the coating composition or the coating amount of the coating composition, preferred examples thereof include a roll coater, a bar coater, a positive rotation roll coater, and a knife coater.

Here, in the production method of the present invention, when the facilitated transport film is formed, it is preferable that the support 12 is coated with the coating composition by the coating device 62 such that the thickness of the coating film (the thickness of the coating composition to be applied to the composite 10) is in a range of 0.05 mm to 2 mm.

From the viewpoints that the facilitated transport film suitably expressing a target function can be formed, generation of a defect caused by mixing of bubbles or foreign matters can be prevented, and drying is sufficiently carried out using the drying device 56 described below, it is preferable that the thickness of the coating film of the coating composition is in the above-described range.

Further, from this viewpoint, the thickness of the coating film which becomes the facilitated transport film is more preferably in a range of 0.1 mm to 1.5 mm.

Moreover, according to the production method of the present invention, the film thickness of the facilitated transport film to be formed by drying the coating composition described below may be appropriately set according to the composition or the like of the facilitated transport film to achieve the film thickness in which target performance is obtained. Specifically, the thickness of the facilitated transport film is preferably in a range of 3 μm to 1000 μm and more preferably in a range of 5 μm to 500 μm. The film thickness of the facilitated transport film may be controlled in the same manner as that of the silicone resin layer 14 described above.

In other words, it is preferable that the coating composition is prepared such that the facilitated transport film having the same thickness as that of the coating film described above can be obtained.

From the viewpoint of improving the gas permeability and suppressing generation of a defect, t is preferable that the film thickness of the facilitated transport film is in the above-described range.

Moreover, according to the production method of the present invention, facilitated transport films with plural layers having compositions which are the same as or different from each other may be formed.

The composite 10 coated with the coating composition by the coating unit 54 is guided by a pass roller 68a that is brought into contact with the rear surface (surface on the opposite side of the surface coated with the coating composition) and conveyed to the drying device 56.

The drying device 56 (drying process) is a portion in which the acidic gas separation film 18 is prepared by removing at least some water from the coating composition applied to the support 12 and drying the water (or further crosslinking the hydrophilic compound) for formation of the facilitated transport film (acidic gas separation layer 16).

As the drying method, various known drying methods, for example, a hot-air drying method, a drying method in which drying is carried out by heating the support 12, and a drying method in which drying is carried out by removing water can be used.

In the case of hot-air drying, the air speed of the hot air may be determined by appropriately setting a speed thereof which can rapidly dry the coating composition and at which the coating film (gel film) of the coating composition does not collapse. Specifically, the air speed thereof is preferably in a range of 0.5 m/min to 200 m/min, more preferably in a range of 0.75 m/min to 200 m/min, and particularly preferably in a range of 1 m/min to 200 m/min.

The temperature of the hot air may be determined by appropriately setting a temperature at which deformation or the like of the support 12 does not occur and the coating composition can be rapidly dried. Specifically, the temperature of the film surface is preferably in a range of 1° C. to 120° C., more preferably 2° C. to 115° C., and particularly preferably 3° C. to 110° C.

In the case of drying which is carried out by heating the support 12, the temperature at which deformation or the like of the support 12 does not occur and the coating composition can be rapidly dried may be appropriately set. In addition, the heating of the support 12 and blowing of dry air may be used in combination.

Specifically, the drying is performed by setting the temperature of the support 12 to be preferably in a range of 60° C. to 120° C., more preferably in a range of in a range of 60° C. to 90° C., and particularly preferably in a range of 70° C. to 80° C. At this time, the film surface temperature is preferably in a range of 15° C. to 80° C. and more preferably in a range of 30° C. to 70° C.

The composite 10, that is, the acidic gas separation film 18 in which the coating film of the coating composition is dried using the drying device 56 is guided by a pass roller 68b and conveyed to the winding unit 58.

The winding unit 58 winds the acidic gas separation film 8 around a winding shaft 70 to obtain the separation film roll 18R.

The winding unit 58 includes the above-described winding shaft 70 and three pass rollers 68c to 68e.

The acidic gas separation film 18 is guided to a predetermined conveying path by the pass rollers 68c to 68e and wound around the winding shaft 70 (separation film roll 18R) to be formed as the separation film roll 18R.

The three pass rollers 68c to 68e are operated as a tension cutter and guide the film such that the composite 10 or the like meander.

Hereinafter, the method of producing a composite of the present invention will be described in more detail by describing an example of the operations of the production apparatus 20 and the production apparatus 50.

First, the support roll 12R is mounted on the rotary shaft 31 of the supply unit 24 of the production apparatus 20 and the support 12 is fed from the support roll 12R by rotating the rotary shaft 31. Next, the support 12 fed from the support roll 12R passes through (inserts into/feeds paper through) a predetermined conveying path leading to the winding shaft 40 after passing through the coating unit 26 (backup roller 34), the curing device 28, and the pass rollers 38a to 38e, and the tip of the support 12 is wound around the winding shaft 40.

Further, the support 12 has a two-layer structure consisting of the porous film 12a and the auxiliary support film 12b as illustrated in FIG. 1A. Moreover, in the support 12, the peel force between the porous film 12a and the auxiliary support film 12b is 10 mN/mm or less.

The support roll 12R is mounted on the rotary shaft 31 such that the porous film 12a side faces the coating device 32.

In addition, the coating device 32 is filled with a required amount of the silicone coating solution. In the present example, the silicone coating, solution is applied at room temperature. Accordingly, the viscosity of the silicone coating solution is in a range of 100 cP to 1000000 cP at room temperature.

When the support 12 passes through the predetermined conveying path and then the coating device 32 is filled with the silicone coating solution, the rotary shaft 31, the winding shaft 40, the backup roller 34, and the like are synchronized with each other to be driven and the conveyance of the support 12 is started. Further, the conveying speed of the support 12 is in a range of 0.5 m/min to 200 m/min.

The support 12 fed from the support roll 12R is conveyed in the longitudinal direction. At the same time, in the coating unit 26, the support 12 is conveyed while being supported by the backup roller 34 in a predetermined coating position and is coated with the silicone coating solution, which becomes the silicone resin layer 14, by the coating device 32 so as to have a target coating thickness (coating amount).

Further, in the present invention, the peel force between the porous film 12a and the auxiliary support film 12b is 10 mN/mm or greater, the viscosity of the silicone coating solution is in a range of 100 cP to 1000000 cP, and the conveying speed of the support 12 is in a range of 0.5 m/min to 200 m/min, as described above. Therefore, it is possible to prevent the porous film 12a and the auxiliary support film 12b from being peeled off when the silicone coating solution is applied and suitably prevent the infiltration of the silicone coating solution into the porous film 12a which is a porous material.

The support 12 coated with the silicone coating solution which becomes the silicone resin layer 14 is conveyed to the curing device 28 arranged right behind the coating unit.

In addition, for example, the silicone coating solution is cured using the curing device 28, for example, by performing irradiation with ultraviolet rays to form the silicone resin layer 14, thereby forming the composite 10.

The composite 10 on which the silicone resin layer 14 is formed is guided to a predetermined conveying path by the pass rollers 38a to 38d to be conveyed to the winding unit 30, guided to the winding shaft 40 by the pass roller 38e, and wound around the winding shaft 40 to obtain the composite roll 10R.

When the composite roll 10R formed by winding the composite 10 having a target length is completed, the composite 10 is cut and the composite roll 10R is removed from the winding shaft 40, if necessary, and then the composite roll 10R is mounted on the rotary shaft 61 of the supply unit 52 of the production apparatus 50.

Subsequently, the composite 10 is fed from the composite roll 10R by rotating the rotary shaft 61. Next, the composite 10 fed from the composite roll 10R passes through a predetermined conveying path leading to the winding shaft 70 after passing through the coating unit 54 (backup roller 64), the pass roller 68a, the drying device 56, and the pass rollers 68b and 68c to 68e, and the tip of the composite 10 is wound around the winding shaft 70.

Further, the coating device 62 is filled with a required amount of the coating composition. Moreover, as described above, it is preferable that the viscosity of the coating composition at 25° C. is 100 cP or greater.

When the composite 10 passes through the predetermined conveying path and the coating device 62 is filled with the coating composition, the rotary shaft 61, the winding shaft 70, the backup roller 64, and the like are synchronized with each other to be driven, and the conveyance of the composite 10 is started.

The composite 10 fed from the composite roll 10R is conveyed in the longitudinal direction. At the same time, in the coating unit 54, the composite 10 is conveyed in the longitudinal direction while being supported by the backup roller 64 in a predetermined coating position and is coated with the coating composition, which becomes the acidic gas separation layer 16, by the coating device 62 so as to have a predetermined coating thickness (coating amount).

The composite 10 coated with the coating composition which becomes the acidic gas separation layer 16 subsequently reaches the drying device 56 by being guided by the pass roller 68a and the coating composition is dried by the drying device 56, thereby obtaining the acidic gas separation film 18 on which the acidic gas separation layer 16 is formed and which is a kind of a composite produced by the production method of the present invention.

The acidic gas separation film 18 is guided by the pass roller 68b, conveyed to the winding unit 58, guided to a predetermined conveying path by the pass rollers 68c to 68e, and wound around the winding shaft 70 to obtain the separation film roll 18R.

The production apparatus 20 illustrated in the figure includes only the coating device 32 and the curing device 28 and the production apparatus 50 includes only the coating device 62 and the drying device 56. In other words, in a case of using, these devices, the silicone resin layer 14 and the acidic gas separation layer 16 are formed by separate devices.

Figure 4:
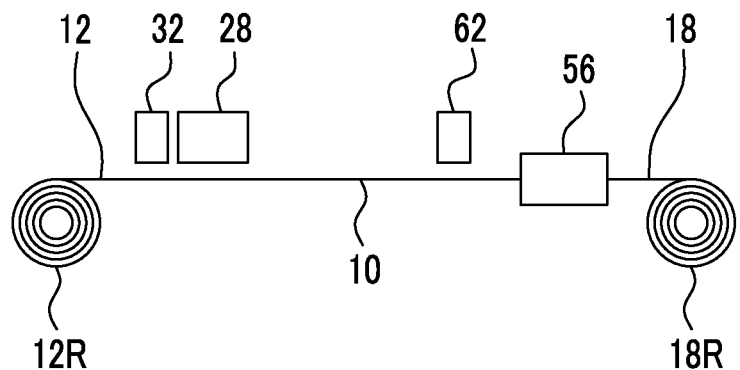
FIG. 4 is a view schematically illustrating another example of a production apparatus that performs the method of producing a composite according to the present invention.

However, according to the production method of the present invention, the silicone resin layer 14 and the acidic gas separation layer 16 may be formed to prepare the acidic gas separation film 18 by performing the feeding and the winding from the rolls once according to the RtoR system using an apparatus including the coating device 32 and the curing device 28 and the coating device 62 and the drying device 56, as conceptually illustrated in FIG. 4.

Hereinbefore, the method of producing a composite of the present invention has been described in detail, but the present invention is not limited to the examples described above. Further, various improvements or modifications are possible within the range not departing from the scope of the present invention.

EXAMPLES

Hereinafter, the method of producing a composite of the present invention will be described in more detail with reference to specific examples of the present invention.

Example 1

<Silicone Coating Solution>
UV9300 (manufactured by Momentive Performance Materials Inc.) was used as a silicone coating solution used for forming a silicone resin layer. Further, 0.5% by weight of 4-isopropyl-4'-methyldiphenyliodoniumtetrakis(pentafluorophenyl)borate (manufactured by Tokyo Chemical Industry Co., Ltd.) was added to a silicone resin as a curing agent.

The viscosity of this silicone coating solution (silicone coating solution to which a curing agent was added) at 25° C. was measured at a rotation speed of 60 rpm using TVB-10M (manufactured by TOKI SANGYO CO., LTD.), which is a B-type viscometer, and spindle No. M4 as a rotor after 30 seconds from when the rotation was started in conformity with JIS Z8803. As a result, the viscosity of the silicone coating solution at 25° C. was 300 cP.

<Support>
The support roll 12R formed by winding a long (porous) support 12 having a width of 500 mm and a thickness of 200 μm, in a roll shape, was prepared. Further, a laminate (manufactured by General Electric Company) formed by laminating porous PTFE, serving as the porous film 12a, on the surface of PP non-woven fabric, serving as the auxiliary support film 12b, was used as the support 12.

A support obtained by bonding the porous film 12a having a thickness of 50 μm to the auxiliary support film 12b having a thickness of 200 μm through thermocompression using a roll was used as the support 12.

The peel force between the porous film 12a and the auxiliary support film 12b of the support 12 was measured, and the value was 100 mN/mm.

The peel force was measured according to the following method.

A test piece was prepared by cutting out a short piece having a size of 25 mm×100 mm from the support roll 12R. The porous film 12a and the auxiliary support film 12b were peeled off from a part of the end portion of this test piece using Kapton tape or the like. The portion from which the porous film 12a and the auxiliary support film 12b are peeled off is interposed between chucks and a 180° peeling test at a rate of 10 mm/min was performed using a tensile strength tester (manufactured by A&D Company, Limited). A value obtained by performing 20 mm peeling and normalizing the average value of peeling loads by the width of the test piece was set to the peel force.

<Preparation of Composite 10>

The support roll 12R was loaded to the rotary shaft 31 of the supply unit 24 of the production apparatus 20 illustrated in FIG. 2 such that the porous film 12a side was coated with silicone coating solution. Next, as described above, the support 12 fed from the support roll 12R was allowed to pass through a predetermined conveying path leading to the winding unit 30 after passing through the coating unit 26 and the curing device 28, and the tip of the support 12 was wound around the winding shaft 40.

In addition, the coating device 32 of the coating unit 26 was filled with the silicone coating solution. Moreover, in the coating device 32, the temperature of the silicone coating solution filling the coating device 32 was controlled to be in a range of 24° C. to 25° C.

After the above-described preparation was completed, the conveyance of the support 12 was started, the surface of the porous film 12a was coated with the silicone coating solution by the coating unit 26 as described above, the silicone coating solution was cured by irradiation with ultraviolet rays using the curing device 28, and the composite 10 configured by forming the silicone resin layer 14 on the support 12 was obtained. Further, the prepared composite 10 was wound around the winding shaft 40, thereby obtaining the composite roll 10R.

The conveying speed of the support 12 was set to 50 m/min. Moreover, after the application of the silicone coating solution, the irradiation position and the irradiation amount of ultraviolet rays in the curing device 28 were adjusted such that the silicone coating solution was cured within 4 seconds.

The silicone coating solution was applied such that the thickness of the silicone resin layer 14 was 10 μm.

Moreover, after the application of the silicone coating solution, the relationship between the time taken for the silicone coating solution to be cured and the irradiation amount of ultraviolet rays, the film thickness of the silicone resin layer 14, and the coating amount of the silicone coating solution were examined by carrying out a test in advance.

<Coating Composition of Acidic Gas Separation Layer 16>

As the coating composition used to form the acidic gas separation layer 16, an aqueous solution including 2.4% by mass of a polyvinyl alcohol-polyacrylic acid copolymer (KURASTOMER AP-20, manufactured by KURARAY CO., LTD.) and 0.01% by mass of a crosslinking agent (25 mass % glutaraldehyde aqueous solution, manufactured by Wako Pure Chemical Industries, Ltd.) was prepared. 1 M hydrochloric acid was added to the aqueous solution until the pH thereof became 1.5 and then cross-linked.

After the crosslinking, a 40% cesium carbonate aqueous solution (manufactured by Kisan Kinzoku Chemicals Co., Ltd.) and a potassium carbonate aqueous solution (manufactured by Wako Pure Chemical Industries, Ltd.), serving as a carrier, were added to the solution such that the concentration of cesium carbonate was 5% by mass and the concentration of potassium carbonate was 1% by mass. That is, the cesium carbonate and the potassium carbonate became carriers of the acidic gas separation layer 16 in the present example. In addition, a surfactant was added to the solution such that the surface tension of the coating composition became 30 mN/m.

<Preparation of Acidic Gas Separation Film 18>

In the production apparatus 50 illustrated in FIG. 3, the acidic gas separation layer 16 having a film thickness of 30 μm was formed by coating the surface of the silicone resin layer 14 side of the composite 10 with the coating composition and drying the composition, thereby preparing the acidic gas separation film 18 formed of the acidic gas separation layer 16 and the composite 10. Further, the prepared acidic gas separation film 18 was wound around the winding shaft 70 to obtain the separation film roll 18R.

Further, the conveying speed of the composite 10 was set to 3 m/min. The viscosity of the coating composition at 25° C. was 1100 cP. The viscosity was measured at a rotation speed of 60 rpm using TVB-10M (manufactured by TOKI SANGYO CO., LTD.), which is a B-type viscometer, and spindle No. M4 as a rotor after 30 seconds from when the rotation was started in conformity with JIS Z8803.

Example 2

The composite 10 was produced and the acidic gas separation film 18 was produced in the same manner as in Example 1 except that the support 12 which was produced by adjusting the time for compression, the temperature, and the like and in which the peel force between the porous film 12a and the auxiliary support film 12b was 10 mN/mm was used.

Example 3

The composite 10 was produced and the acidic gas separation film 18 was produced in the same manner as in Example 1 except that UV9300 was diluted with heptane, the concentration thereof was set to 98% by mass, and the viscosity of the silicone coating solution at 25° C. was set to 100 cP.

Example 4

The composite 10 was produced and the acidic gas separation film 18 was produced in the same manner as in Example 1 except that a silica filler was added and the viscosity of the silicone coating solution at 25° C. was set to 500000 cP.

Example 5

The composite 10 was produced and the acidic gas separation film 18 was produced in the same manner as in Example 1 except that the conveying speed of the support was set to 25 m/min.

Further, the time taken for the silicone coating solution to be cured after the silicone coating solution was applied was 8 seconds.

Example 6

The composite 10 was produced and the acidic gas separation film 18 was produced in the same manner as in Example 1 except that the conveying speed of the support was set to 100 m/min.

Further, the time taken for the silicone coating solution to be cured after the silicone coating solution was applied was 2 seconds.

Example 7

The composite 10 was produced and the acidic gas separation film 18 was produced in the same manner as in Example 6 except that KF-102 (manufactured by Shin-Etsu Chemical Co., Ltd.) was used as a material of the silicone coating solution in place of UV9300 and the viscosity of the silicone coating solution was set to 4000 cP.

Comparative Example 1

The support was coated with the silicone coating solution in the same manner as in Example 1 except that a support in which the peel force between the porous film and the auxiliary support film was 5 mN/mm was used. However, the silicone resin layer was not able to be appropriately formed because the porous film and the auxiliary support film were peeled off while the support was coated with the silicone coating solution. Therefore, the acidic gas separation film was not able to be prepared.

Comparative Example 2

The composite was produced and the acidic gas separation film was produced in the same manner as in Example 1 except that UV9300 was diluted with heptane, the concentration thereof was set to 20% by mass, and the viscosity of the silicone coating solution at 25° C. was set to 50 cP.

Comparative Example 3

The support was coated with the silicone coating solution in the same manner as in Example 1 except that the support was exposed to light in a state of the coating solution in advance and the viscosity of the silicone coating solution at 25° C. was set to 1200000 cP. However, since the viscosity of the coating solution was high, the support was not able to be uniformly coated with the silicone coating solution, and thus the film thickness of the silicone coating layer was non-uniform. Further, the silicone resin layer was not able to be appropriately formed because the porous film and the auxiliary support film were peeled off while the support was coated with the silicone coating solution. Therefore, the acidic gas separation film was not able to be prepared.

Comparative Example 4

The composite was produced and the acidic gas separation film was produced in the same manner as in Example 1 except that the conveying speed of the support was set to 0.1 m/min.

In addition, the time taken for the silicone coating solution to be cured after the silicone coating solution was applied was 33 minutes and 20 seconds (2000 seconds).

Comparative Example 5

The support was coated with the silicone coating solution in the same manner as in Example 1 except that the conveying speed of the support was set to 500 m/min. However, the silicone resin layer was not able to be appropriately formed because the porous film and the auxiliary support film were peeled off while the support was coated with the silicone coating solution. Therefore, the acidic gas separation film was not able to be prepared.

[Evaluation]

The presence or absence of film defects in the prepared acidic gas separation film 18 was evaluated by measuring the gas permeability at multiple sites of the acidic gas separation film 18.

The acidic gas separation films 18 were pulled from each of the prepared separation film rolls 18R and cut out at arbitrary positions, thereby preparing samples of circular acidic gas separation films 18 having a diameter of 47 mm. Further, six samples were prepared by cutting out the circular samples at a total of six sites, that were, three sites in a TD direction (flow direction) and two sites in an MD direction (vertical direction).

The circular samples which were cut out were interposed between both surfaces of the film to prepare permeation test samples (effective area of 2.40 cm$^2$) using two sheets of PTFE membrane filters (pore diameter of 0.10 μm, manufactured by Tokyo Roshi Kaisha, Ltd.).

As test gas, mixed gas of $CO_2$ and $H_2$ at a volume ratio of 10:90 was used. The mixed gas was supplied to each of the prepared samples under the conditions of a relative humidity of 70%, a flow rate of 100 mL/min, a temperature of 130° C., and a total pressure of 3 atm. Further, Ar gas (flow rate of 90 mL/min) was allowed to flow to the permeation side.

The permeated gas was analyzed by gas chromatography, and a separation factor α was calculated from a ratio of the $H_2$ permeation rate to the $CO_2$ permeation rate. The evaluation was performed based on the following criteria.

A: α is 80 or greater in all six sites.

B: α is greater than 10 and less than 80 in at least one site.

C: α is 10 or less in at least one site.

The results are listed in the following table.

TABLE 1

| | Porous support | | | Silicone resin layer | | | |
| --- | --- | --- | --- | --- | --- | --- | --- |
| | Porous film | Auxiliary support film | Peel force mN/mm | Material | Viscosity cP | Conveying speed m/min | Time taken for solution to be cured seconds | Evaluation |
| Example 1 | PTFE | PP non-woven fabric | 100 | UV9300 | 300 | 50 | 4 | A |
| Example 2 | PTFE | PP non-woven fabric | 10 | UV9300 | 300 | 50 | 4 | A |
| Example 3 | PTFE | PP non-woven fabric | 100 | UV9300 | 100 | 50 | 4 | B |
| Example 4 | PTFE | PP non-woven fabric | 100 | UV9300 | 500000 | 50 | 4 | A |
| Example 5 | PTFE | PP non-woven fabric | 100 | UV9300 | 300 | 25 | 8 | B |
| Example 6 | PTFE | PP non-woven fabric | 100 | UV9300 | 300 | 100 | 2 | A |
| Example 7 | PTFE | PP non-woven fabric | 100 | KF-102 | 4000 | 100 | 2 | A |
| Comparative Example 1 | PTFE | PP non-woven fabric | 5 | UV9300 | 300 | 50 | — | — |

TABLE 1-continued

| | Porous support | | | Silicone resin layer | | | | |
| --- | --- | --- | --- | --- | --- | --- | --- | --- |
| | Porous film | Auxiliary support film | Peel force mN/mm | Material | Viscosity cP | Conveying speed m/min | Time taken for solution to be cured seconds | Evaluation |
| Comparative Example 2 | PTFE | PP non-woven fabric | 100 | UV9300 | 50 | 50 | 4 | C |
| Comparative Example 3 | PTFE | PP non-woven fabric | 100 | UV9300 | 12000000 | 50 | — | — |
| Comparative Example 4 | PTFE | PP non-woven fabric | 100 | UV9300 | 300 | 0.1 | 2000 | C |
| Comparative Example 5 | PTFE | PP non-woven fabric | 100 | UV9300 | 300 | 500 | — | — |

In the acidic gas separation film 18 of Examples 1 to 7 using the composite 10 produced according to the production method of the present invention, the porous film and the auxiliary support film were not peeled off and gas permeability was excellent, as listed in the above-described table.

Meanwhile, in Comparative Example 1 in which the peel force between the porous film and the auxiliary support film was less than 10 mN/mm, Comparative Example 3 in which the viscosity of the silicone coating solution was high, and Comparative Example 5 in which the conveying speed of the support was high, the porous film and the auxiliary support film were peeled off and the acidic gas separation film was not able to be prepared.

Further, in Comparative Example 2 in which the viscosity of the silicone coating solution was low and Comparative Example 4 in which the conveying speed of the support was low, since the silicone coating solution infiltrated into the support, the silicone resin layer was not able to be appropriately formed. Consequently, entering the acidic gas separation layer into the porous support was not able to be prevented and then the performance of separating out acidic gas was degraded.

Moreover, when Example 1 was compared to Example 5, it was understood that the time taken for the silicone coating solution to be cured was preferably 7 seconds or shorter. The effects of the present invention are evident from the above-described results.

INDUSTRIAL APPLICABILITY

The present invention can be preferably applied to an acidic gas separation film used for production of hydrogen gas, purification of natural gas, and the like.

EXPLANATION OF REFERENCES

10: composite
10R: composite roll
12: porous support
12R: support roll
12a: porous film
12b: auxiliary support film
14: silicone resin layer
16: acidic gas separation layer
18: acidic gas separation film
18R: separation film roll
20, 50: production apparatus
24, 52: supply unit
26, 54: coating unit
28: curing device
30, 58: winding unit
31, 61: rotary shaft
32, 62: coating device
34, 64: backup roller
38a to 38e, 68a to 68e: pass roller
40, 70: winding shaft
56: drying device

What is claimed is:

1. A method of producing a composite formed by forming a silicone resin layer on a surface of a porous support and having a surface on which an acidic gas separation layer is formed in an acidic gas separation film having the acidic gas separation layer, the method comprising:
    coating a surface of a porous film side of the porous support with a silicone coating solution which becomes the silicone resin layer according to a roll-to-roll system using, as the porous support, a support formed by laminating an auxiliary support film on the porous film,
    wherein, in the coating of the surface thereof, a conveying speed of the porous support is in a range of 0.5 m/min to 200 m/min,
    a viscosity of the silicone coating solution is in a range of 100 cP to 1000000 cP, and
    a peel force between the porous film and the auxiliary support film is in a range of 10 mN/mm to 500 mN/mm.

2. The method of producing a composite according to claim 1, further comprising coating the surface of the silicone resin layer with a coating composition which becomes the acidic gas separation layer using the roll-to-roll system.

3. The method of producing a composite according to claim 1, wherein the acidic gas separation layer is a facilitated transport film which contains a carrier at least reacting with acidic gas and a hydrophilic compound for carrying the carrier.

4. The method of producing a composite according to claim 2, wherein the acidic gas separation layer is a facilitated transport film which contains a carrier at least reacting with acidic gas and a hydrophilic compound for carrying the carrier.

5. The method of producing a composite according to any one of claim 1, wherein the porous film includes one or more materials selected from the group consisting of a fluorine-containing polymer, an olefin polymer, and a sulfone polymer.

6. The method of producing a composite according to any one of claim 1, wherein the porous film includes one or more materials selected from the group consisting of PTFE, polypropylene, polysulfone, and polyether sulfone.

7. The method of producing a composite according to any one of claim 2, wherein the porous film includes one or more materials selected from the group consisting of PTFE, polypropylene, polysulfone, and polyether sulfone.

8. The method of producing a composite according to any one of claim 4, wherein the porous film includes one or more materials selected from the group consisting of PTFE, polypropylene, polysulfone, and polyether sulfone.

9. The method of producing a composite according to any one of claim 1, wherein the auxiliary support film is non-woven fabric which includes one or more materials selected from the group consisting of polypropylene, modified polyamide, and a fluorine-containing resin.

10. The method of producing a composite according to any one of claim 2, wherein the auxiliary support film is non-woven fabric which includes one or more materials selected from the group consisting of polypropylene, modified polyamide, and a fluorine-containing resin.

11. The method of producing a composite according to any one of claim 4, wherein the auxiliary support film is non-woven fabric which includes one or more materials selected from the group consisting of polypropylene, modified polyamide, and a fluorine-containing resin.

12. The method of producing a composite according to any one of claim 8, wherein the auxiliary support film is non-woven fabric which includes one or more materials selected from the group consisting of polypropylene, modified polyamide, and a fluorine-containing resin.

13. The method of producing a composite according to any one of claim 1, further comprising curing the silicone coating solution to form the silicone resin layer within seven seconds after the surface of the porous film is coated with silicone coating solution.

14. The method of producing a composite according to any one of claim 2, further comprising curing the silicone coating solution to form the silicone resin layer within seven seconds after the surface of the porous film is coated with silicone coating solution.

15. The method of producing a composite according to any one of claim 4, further comprising curing the silicone coating solution to form the silicone resin layer within seven seconds after the surface of the porous film is coated with silicone coating solution.

16. The method of producing a composite according to any one of claim 12, further comprising curing the silicone coating solution to form the silicone resin layer within seven seconds after the surface of the porous film is coated with silicone coating solution.

* * * * *